(12) United States Patent
Duverneuil et al.

(10) Patent No.: US 7,757,494 B2
(45) Date of Patent: Jul. 20, 2010

(54) DEVICE FOR FEEDING FUEL TO A COMBUSTION CHAMBER IN A TURBOMACHINE

(75) Inventors: Katia Duverneuil, Avon (FR); Gilles Gerard Lhuillery, Corbeil-Essonnes (FR); Marc Stephan, Melun (FR)

(73) Assignee: Snecma, Paris (FR)

( * ) Notice: Subject to any disclaimer, the term of this patent is extended or adjusted under 35 U.S.C. 154(b) by 793 days.

(21) Appl. No.: 11/410,067

(22) Filed: Apr. 25, 2006

(65) Prior Publication Data

US 2007/0033940 A1 Feb. 15, 2007

(30) Foreign Application Priority Data

Apr. 26, 2005 (FR) .................................. 05 04153

(51) Int. Cl.
*F02C 7/20* (2006.01)
*F02C 7/22* (2006.01)
(52) U.S. Cl. .......................................... 60/800; 60/739
(58) Field of Classification Search .................. 60/800, 60/739
See application file for complete search history.

(56) References Cited

U.S. PATENT DOCUMENTS

| 3,775,975 | A | * | 12/1973 | Stenger et al. ................. 60/739 |
| 3,949,775 | A | * | 4/1976 | Cornell ......................... 60/739 |
| 4,907,743 | A | | 3/1990 | Bouiller et al. |
| 5,273,249 | A | | 12/1993 | Peterson et al. |
| 5,369,952 | A | * | 12/1994 | Walters ......................... 60/796 |
| 5,445,469 | A | * | 8/1995 | Huck et al. .................... 60/799 |
| 6,111,970 | A | * | 8/2000 | Voishvillo et al. ........... 381/398 |
| 2002/0069647 | A1 | | 6/2002 | Mayersky et al. |

* cited by examiner

*Primary Examiner*—Ted Kim
(74) *Attorney, Agent, or Firm*—Oblon, Spivak, McClelland, Maier & Neustadt, L.L.P.

(57) ABSTRACT

A device for feeding fuel to a combustion chamber in a turbomachine, the device comprising both an annular fuel feed rail extending around an outer casing of the combustion chamber, and a plurality of injectors fixed to the casing and opening out into the combustion chamber, the injectors being connected to the rail by fuel transport ducts and by support means that are deformable in bending, twisting, and pivoting, allowing the casing to expand thermally in a radial direction relative to the annular rail and providing rigid support for the annular rail.

5 Claims, 5 Drawing Sheets

DEVICE FOR FEEDING FUEL TO A COMBUSTION CHAMBER IN A TURBOMACHINE

The present invention relates to a device for feeding fuel to a combustion chamber in a turbomachine, such as an airplane turbojet or turboprop.

BACKGROUND OF THE INVENTION

In the device, an annular fuel feed rail extends around an outer cylindrical casing of the combustion chamber and is connected firstly to fuel feed means, and secondly to a plurality of injectors that are secured to the casing and that open out into the combustion chamber.

The injectors are connected to the fuel feed rail by angled fuel transport ducts and by mechanical rail support means that have the function of allowing the casing to expand thermally in a radial direction relative to the annular rail, while nevertheless supporting the annular rail and the angled ducts in a manner that is sufficiently rigid, the annular rail remaining relatively cold while the casing of the combustion chamber is raised, in operation, to a temperature that is relatively high.

It is therefore necessary to find a solution that ensures the rail support means are flexible in order to absorb the thermal expansion of the casing in a radial direction relative to the annular rail, and that presents a degree of rigidity in order to support in satisfactory manner the annular rail and the above-mentioned angled ducts for connection to the injectors.

OBJECTS AND SUMMARY OF THE INVENTION

A particular object of the invention is to satisfy that need in a manner that is effective, simple, and inexpensive.

To this end, the invention provides a device for feeding fuel to a combustion chamber in a turbomachine, such as an airplane turbojet or turboprop, the device comprising both an annular fuel feed rail extending around an outer cylindrical casing of the combustion chamber and connected to fuel feed means, and a plurality of injectors secured to the casing and opening out into the combustion chamber, the injectors being connected to the fuel feed rail by angled fuel transport ducts and by support means for the rail, wherein the rail support means comprise means that are deformable in bending, twisting, and pivoting, allowing the casing to expand thermally in a radial direction relative to the annular rail and providing a rigid support for the annular rail.

These means of the device of the invention that are deformable in bending, twisting, and pivoting allow for a relatively large amount of thermal expansion of the casing radially relative to the annular rail, while holding the annular rail rigidly and while avoiding any deformation or resonant behavior thereof while the engine is in operation.

In a first embodiment of the invention, the deformable means are connected to the annular rail and to the injectors by rigid tabs extending in a common plane at a distance from each other, and comprise at least one, and preferably two, blade springs or coil springs mounted between the rigid tabs, the springs being deformable in bending, twisting, and pivoting, and allowing the casing to expand thermally freely relative to the rail.

In a second embodiment of the invention, the deformable means are connected to the annular rail and to the injectors by rigid tabs that extend in parallel planes, and that may bear against each other or that may be at a distance from each other.

When the parallel tabs bear against each other, they are united by rivets mounted with radial clearance in orifices of said rigid tabs and having heads that retain the rigid tabs axially while providing axial clearance. The sets of rivets allow small radial displacements between the rigid tabs, thus allowing the casing to expand thermally in a radial direction without stressing the rail, which rail is also supported directly by the casing by means of deformable angled tabs.

When the rigid tabs are parallel and at a distance from each other, the above-mentioned support means comprise at least one compression spring extending perpendicularly between the rigid tabs and held between them by a coaxial screw having one end with a head in the form of a spherical cap that is guided on a corresponding seat carried by one of the rigid tabs, thereby forming a ball connection and thus facilitating deformation of the support means in bending, twisting, and pivoting.

In a variant embodiment, the support means comprise a metal cable wound resiliently between the rigid tabs, about an axis parallel thereto, and guided in passages formed in bars secured to said tabs, the ends of the metal cable being held at in orifices in the bars.

In another variant, the support means comprise a metal cushion mounted between the ends of the rigid tabs, and a holding rod extending inside the cushion, perpendicularly to the rigid tabs, and mounted in orifices in the tabs.

In yet another variant, a compression spring extends around the metal cushion, coaxially thereabout, and has its ends bearing against the rigid tabs.

In another variant, the support means comprise a laminated abutment made up of a stack of metal conical washers or blades, or of elastomer washers, the abutment being mounted between the ends of the tabs, perpendicularly thereto, and being secured to said ends by screws.

The support means of the invention are simple in structure and they withstand high temperatures well. They can be mounted between the annular rail and at least some of the fuel injectors. In some embodiments, some of them are constituted by commercially-available deformable means.

BRIEF DESCRIPTION OF THE DRAWINGS

Other characteristics, details, and advantages of invention appear on reading the following description made by way of non-limiting example and with reference to the accompanying drawings, in which.

MORE DETAILED DESCRIPTION

Figure 1:
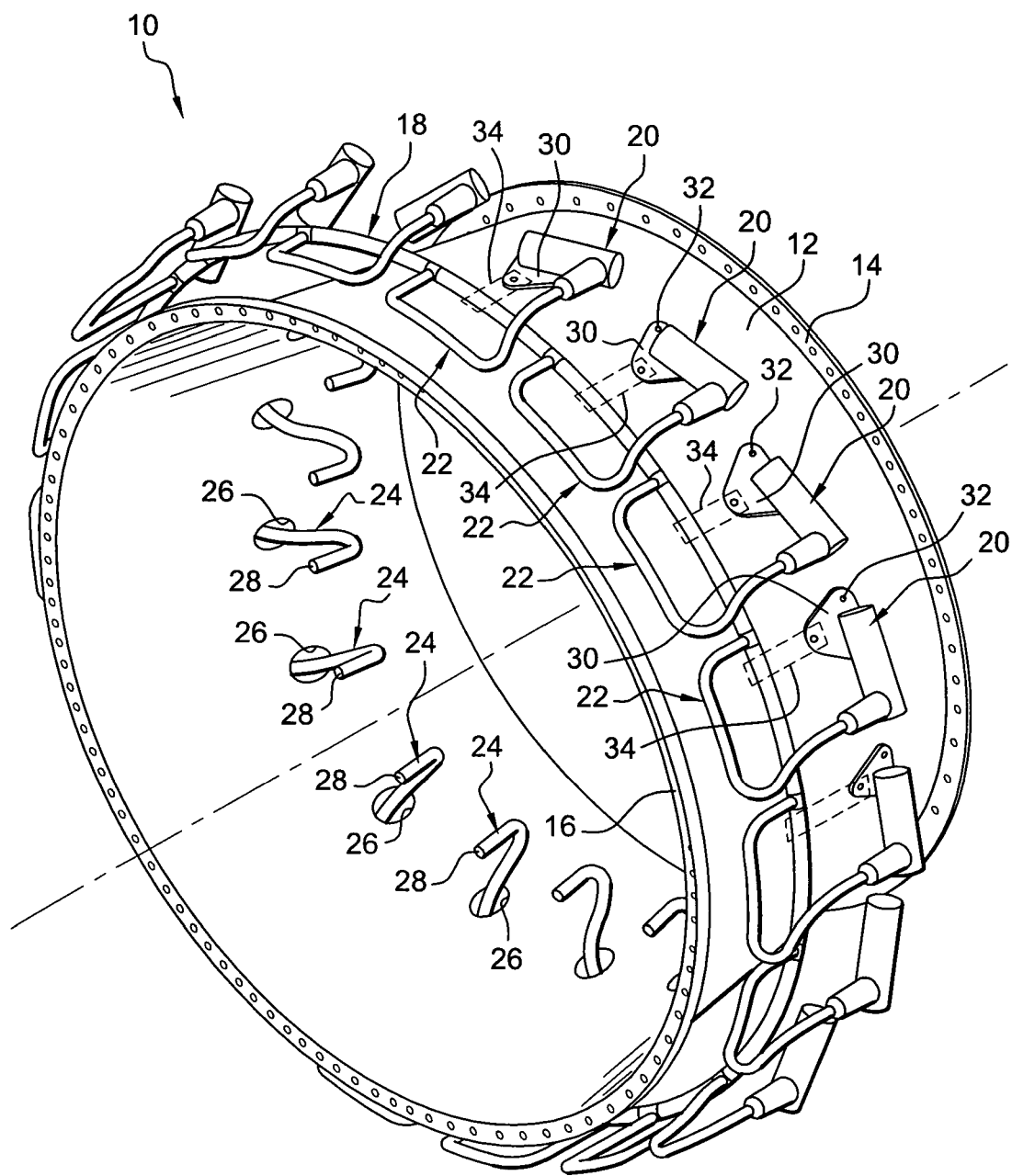
FIG. 1 is a diagrammatic perspective view of the device of the invention for feeding fuel to a combustion chamber in a turbomachine.

FIG. 1 shows a device 10 for feeding fuel to an annular combustion chamber of a turbomachine, the device being carried by an outer cylindrical casing 12 of the combustion chamber, which casing 12 includes at its upstream end an annular flange 14 for securing to a corresponding casing of a compressor of the turbomachine, and at its downstream end an annular flange 16 for securing to a corresponding casing of a turbine of the turbomachine.

The device 10 comprises both an annular rail 18 for feeding fuel that extends around the casing 12 at a distance therefrom, and that is connected to fuel feed means (not shown), and a plurality of injectors 20 that are secured to the casing 12 and that are connected to the rail 18 via fuel transport ducts 22 that are L-shaped or U-shaped and that are connected to the rail 18 perpendicularly thereto via one of their ends, while their other ends are connected to respective injectors 20.

Each injector 20 comprises a duct 24 that extends radially inside the casing 12 through an orifice 26 therein, and that has a radially inner end 28 pointing downstream inside the combustion chamber. The injector 20 is secured to the casing by means of a collar 30 which closes the orifice and which is secured to the casing by screws 32.

Support means 34 connect the rail 18 to at least some of the injectors 20, these means and 34 being represented diagrammatically by dashed lines in FIG. 1.

Figure 2:
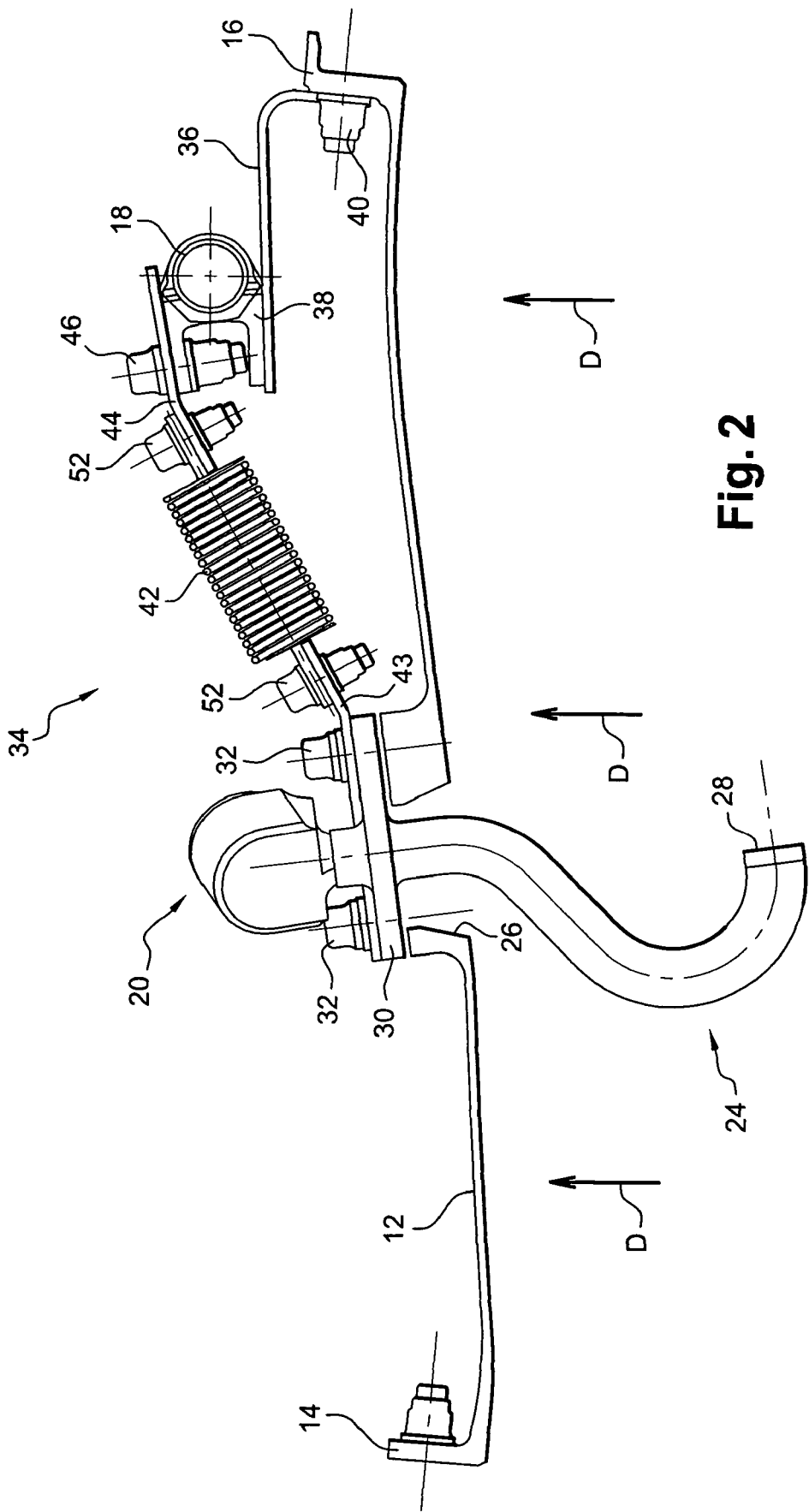
FIG. 2 is a fragmentary diagrammatic view in axial section on a larger scale of an embodiment of the device of invention, showing means for supporting the annular rail for feeding fuel.

The first embodiment of the support means is shown in FIG. 2 in which it can be seen that the rail 18 is also connected to the casing 12 via at least one L-shaped tab 36 having one end secured to a collar 38 mounted around the rail 18, and having its other end secured to the annular flange 16 of the casing by means of at least one screw 40.

Each tab 36 is deformable and allows the casing 12 to expand thermally in a radial direction relative to the rail 18. The tabs and 36 are regularly distributed around the periphery of the rail 18.

The support means 34 of FIG. 2 comprise two traction springs 42 having their ends secured to a rigid tabs 43, 44 carried by the injector 20 and by the rail 18, respectively.

The rigid tab 43 is pressed against the collar 30 of the injector and is secured together therewith on the casing by means of the above-mentioned screws 32, and the rigid tab 44 is secured by at least one screw 46 to the above-mentioned collar 38 mounted around the rail and connected to the angled tab 36. The tabs 43 and 44 have ends that extend towards each other in a common plane.

The springs 42 are coil traction springs that extended parallel beside each other in a plane perpendicular to the plane of the drawing and sloping outwards from upstream to downstream at an angle of about 20° relative to the axis of the casing 12, one of the springs 42 lying in the plane of the drawing.

The ends of the springs 42 are hooked on screws 52 secured to the above-mentioned ends of the rigid tabs 43 and 44.

While the turbomachine is in operation, the injectors 20 and the casing 12 can reach temperatures of about 450° C. while the fuel rail is at a temperature of about 120° C.

This temperature difference leads to the casing 12 expanding thermally in a radial direction relative to the rail 18, as represented by arrows D.

The springs 42 can be deformed in stretching, bending, twisting, and pivoting, and they allow the casing 12 to expand thermally in this way relative to the annular rail 18.

Figure 3:
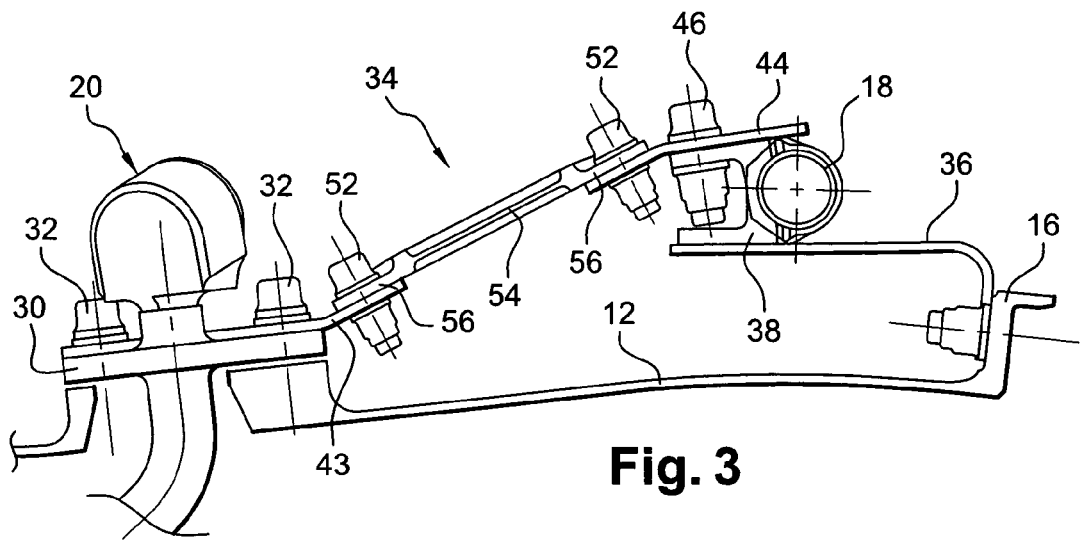
FIGS. 3 to 10 are views corresponding to FIG. 2 and showing variant embodiments of the device of invention.

In the variant embodiment of the invention shown in FIG. 3, the support means 34 comprise at least two elastically deformable metal rods or blades 54 whose ends are secured by screws 52 to the above-mentioned rigid tabs 43 and 44 carried by the injector 20 and by the rail 18, respectively.

The metal rods or blades 54 are elongate and they extend substantially parallel beside each other like the above-mentioned springs 42, one of the blades 54 being situated in the same plane as the drawing.

The ends of the blades 54 are secured to two crossbars 56 that extend perpendicularly to the plane of the drawings, and that are secured two of the above-mentioned ends of the rigid tabs 43 and 44 by the above-mentioned screws 52.

In operation of the turbomachine, and while the casing 12 is thermally expanding radially, the blades 54 deform in bending, twisting, and pivoting in order to limit the stress applied to the rail 18.

Figure 4:
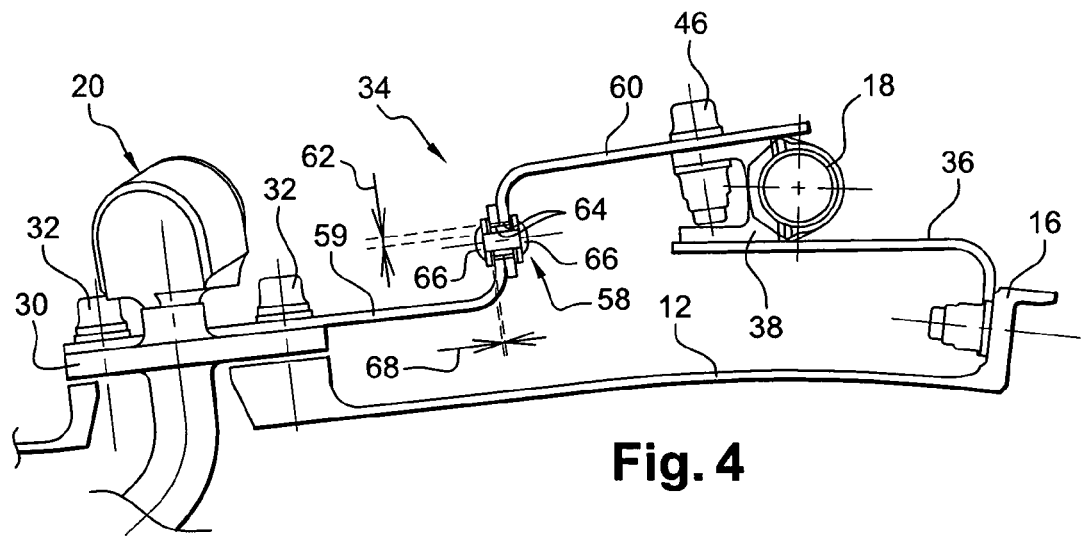

In the variant embodiment of the invention shown in FIG. 4, the support means 34 comprise rivets 58 that are mounted in orifices in the rigid tabs 59 and 60 that are secured to the injector 20 and to the rail 18, respectively.

The rigid tabs 59 and 60 extend towards each other, substantially parallel to each other and to the axis of the casing 12, and they have facing ends that are bent at right angles and pressed one against the other.

The bent end of the rigid tab 59 carried by the injector 20 points substantially radially outwards, while the bent end of the rigid tab 60 carried by the rail 18 points substantially radially inwards.

At least two rivets 58 are mounted with radial clearance 62 in orifices 64 in said ends of the tabs and they extend one beside the other in a plane perpendicular to the plane of the drawing, one of the rivets 56 being situated in the plane of the drawing.

The heads 66 of the rivets are situated at a short distance from the ends of the rigid tabs 59 and 60, and they form means for retaining the tabs axially with axial clearance 68.

The axial clearance 68 and the radial clearance 62 of the rivets are determined so as to allow small relative displacements between the rigid tabs 59 and 60, thereby allowing the casing 12 to expand thermally in a radial direction relative to the annular rail 18, which, like in the other embodiments, is also carried by the tabs 36 secured to the downstream flange of the casing 12.

Figure 5:
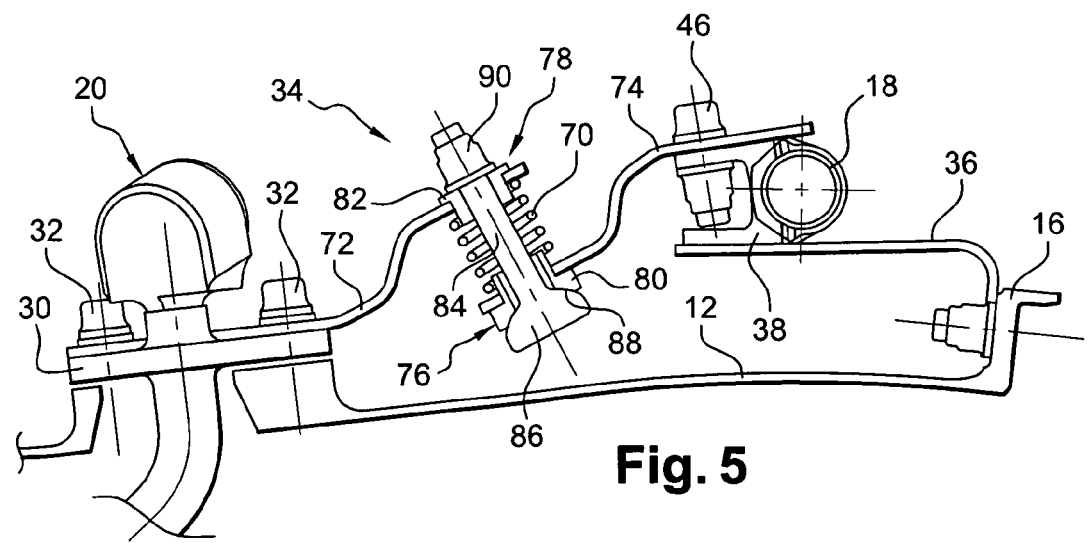

In the variant embodiment of the invention shown in FIG. 5, the support means 34 comprise a compression spring 70 that extends perpendicularly between rigid tabs 72 and 74 secured to the injector 20 and to the rail 18, respectively.

The rigid tabs 72 and 74 extend towards each other and have mutually overlapping facing ends that are parallel and that are spaced apart from each other.

The end of the tab 72 carried by the injector 20 slopes downstream and outwards at about 20° relative to the axis of the casing 12, and the end of the tab 74 carried by the rail 18 is parallel to the end of the tab 72 and situated radially inside it.

The spring 70 is a coil compression spring whose ends bear against the facing faces at the ends of the tabs 72 and 74, and are engaged on bushings 76 and 78 mounted in orifices in the ends of the tabs.

Each bushing 76 or 78 has an outer annular rim 80 or 82 respectively for bearing against the face of a tab situated remote from the spring 70.

A screw 84 extends inside the bushings 80 and 82 and inside the spring 70, on the axis thereof, having at one end a head 86 in the form of a spherical cap that is guided on a corresponding seat 88 formed in the outer rim 80 of the bushing 76 in order to form a ball connection.

The other end of the screw receives a nut 90 that bears against the outer rim 82 of the bushing 78.

The ball connection allows the means 34 to deform in bending, twisting, and pivoting.

Figure 6:
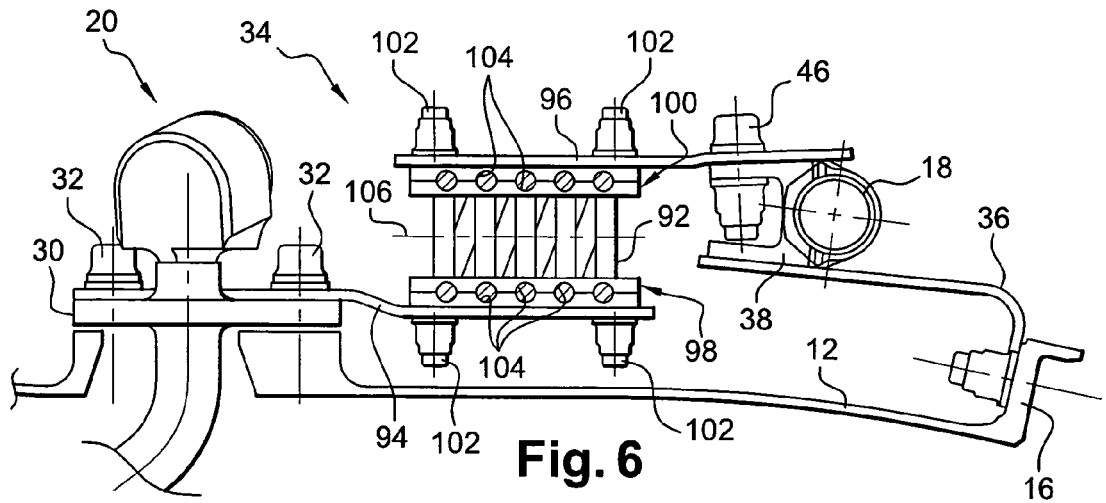

In the variant embodiment of the invention as shown in FIG. 6, the support means 34 comprise a metal cable 92 which is wound or reeled between rigid tabs 94 and 96 secured on the injector 20 and on the rail 18, respectively.

The tabs 94 and 96 extended towards each other and they are substantially parallel to each other and to the axis of the casing 12. They have facing ends that are parallel and at a distance from each other, and that overlap mutually.

The tab 96 connected to the annular rail 18 is situated radially outside the tab 94 connected to the injector 20.

Bars 98 and 100 are secured to the facing ends of the tabs 94 and 96 by means of screws 102.

Each of these bars is in two portions that are pressed against each other and that have transverse grooves 104 in their facing faces so as to form passages for receiving the metal cable 92.

The cable 92 is a wound elastically between the rigid tabs 94 and 96 about an axis 106 parallel thereto, and it passes through the grooves 104 in the bars 98 and 100, while its ends are held and secured in the end grooves of the bars.

The assembly made up of the tabs 94 and 96, the bars 98 and 100, and the wound metal cable 92 is elastically deformable in bending, twisting, and pivoting, and allows the casing 12 to expand thermally in a radial direction relative to the rail 18.

Figure 7:
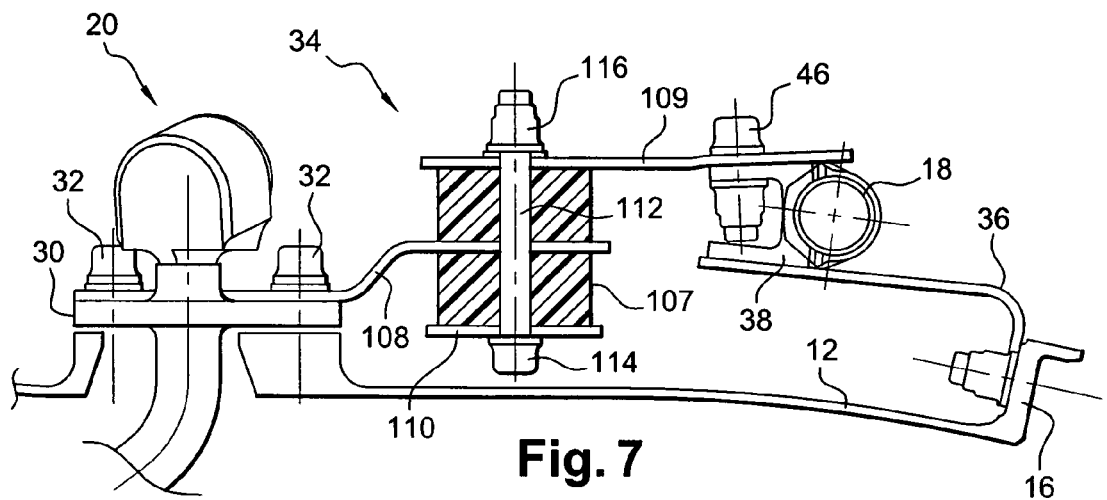

In the variant embodiment shown in FIG. 7, the support means 34 comprise a metal cushion 107 which is mounted between rigid tabs 108 and 109 that are secured to the injector 20 and to the rail 18, respectively.

The tabs 108 and 109 are of the same type as the tabs described with reference to FIG. 6.

The metal cushion 107 extends substantially radially between a support plate 110 and the tab 109, parallel thereto, and is engaged between the two portions of the metal cushion 107, substantially in the middle thereof.

A rod 112 extends axially inside the cushion 107, perpendicularly to the rigid tabs and to the support plate 110, and it passes through orifices therein.

At one end, the rod 112 has a head 114 bearing against the plate 110 on its side remote from the cushion, while its other end is threaded and receives a nut 116 that bears against the rigid tab 109, on its side remote from the cushion.

The assembly formed by the tabs 108 and 109, the plate 110, and the metal cushion 107 is deformable in bending, twisting, and pivoting, and allows the casing 12 to expand thermally in a radial direction relative to the rail 18. By way of example, the cushion 107 can be made of braided metal wires.

Figure 8:
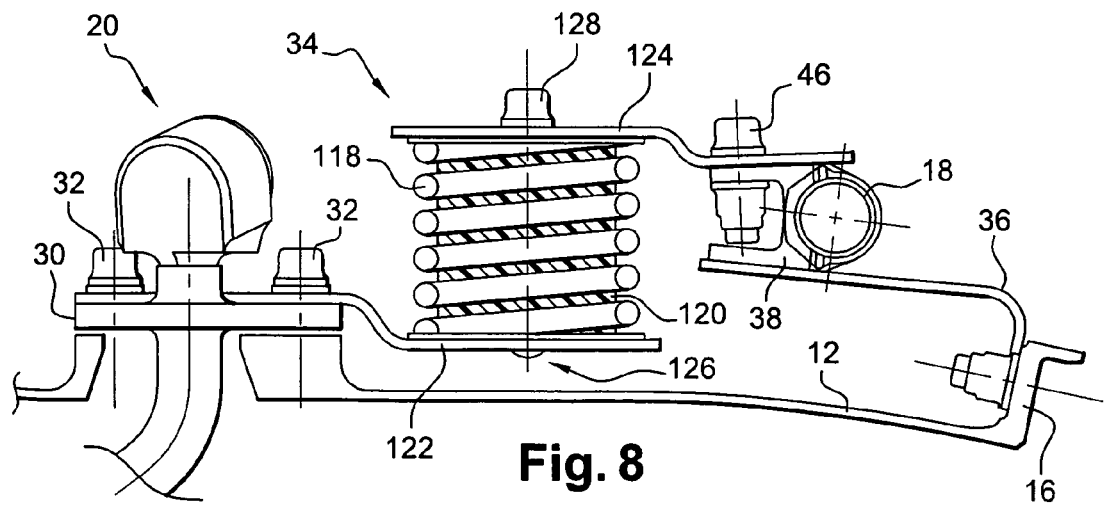

In the variant embodiment of the invention shown in FIG. 8, the support means 34 comprise a compression spring 118 surrounding a metal cushion 120 similar to the above-described cushion 107, and mounted between rigid tabs 122 and 124 secured to the injector 20 and to the rail 18, respectively.

The tabs 122 and 124 are similar to those described with reference to FIG. 6.

The metal cushion 120 extends substantially radially between the rigid tabs 122 and 124.

The spring 118 is a coil compression spring disposed coaxially about the cushion 120 and having its ends bearing against the ends of said rigid tabs 122 and 124.

A rod 126 extends coaxially inside the cushion and the spring, perpendicularly to the rigid tabs 122 and 124, and includes a head 128 bearing against the rigid tab 124, on its side remote from the cushion, while its opposite end is threaded, for example, and receives a nut that bears against the rigid tab 122, on its side remote from the cushion.

The assembly constituted by the rigid tabs 122 and 124, the metal cushion 120, and the associated spring 118 is deformable in bending, twisting, and pivoting, and allows the casing 12 to expand thermally in a direction that is radial relative to the rail 18.

Figure 9:
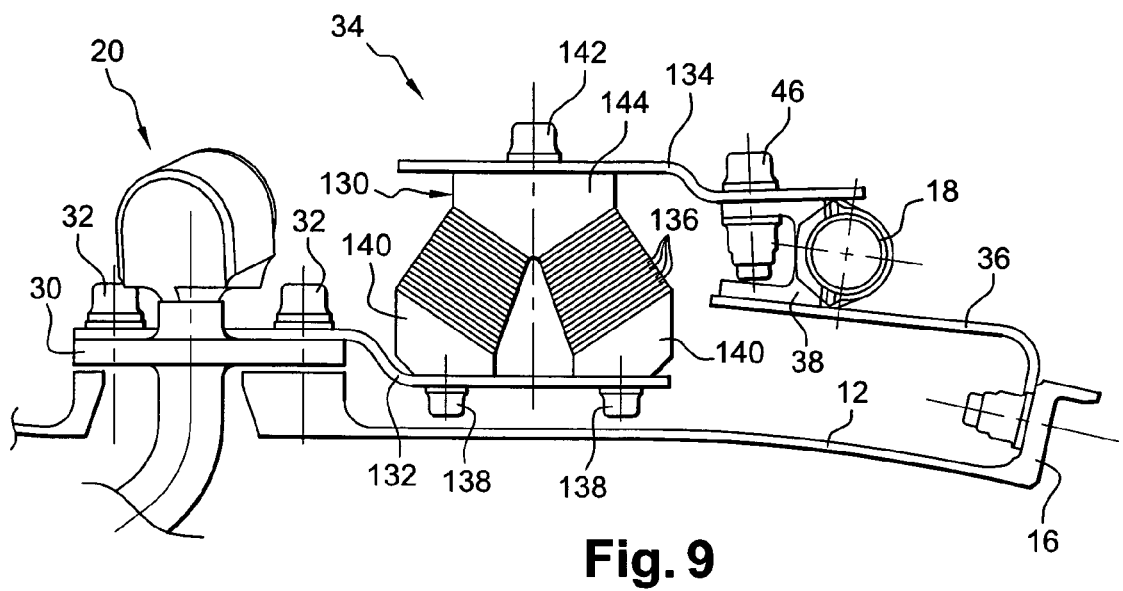

In the variant embodiment of the invention shown in FIG. 9, the support means 34 comprise a conical laminated abutment 130 that is mounted between rigid tabs 132 and 134 secured to the injector 20 and to the rail 18, respectively.

The tabs 132 and 134 are similar to those of FIG. 6.

The abutment 130 is made up of a stack of metal conical washers or blades 136 and it extends substantially radially between the rigid tabs 132 and 134.

The abutment 130 is secured to the inner rigid tab 132 by means of screws 138 engaged in two sloping legs 140 supporting the blades 136, and it is fixed by means at least one screw 142 to the outer rigid tab 134, the screw 142 being screwed into a central leg 144 supporting the blades 136.

The abutment 130 is commercially available.

Figure 10:
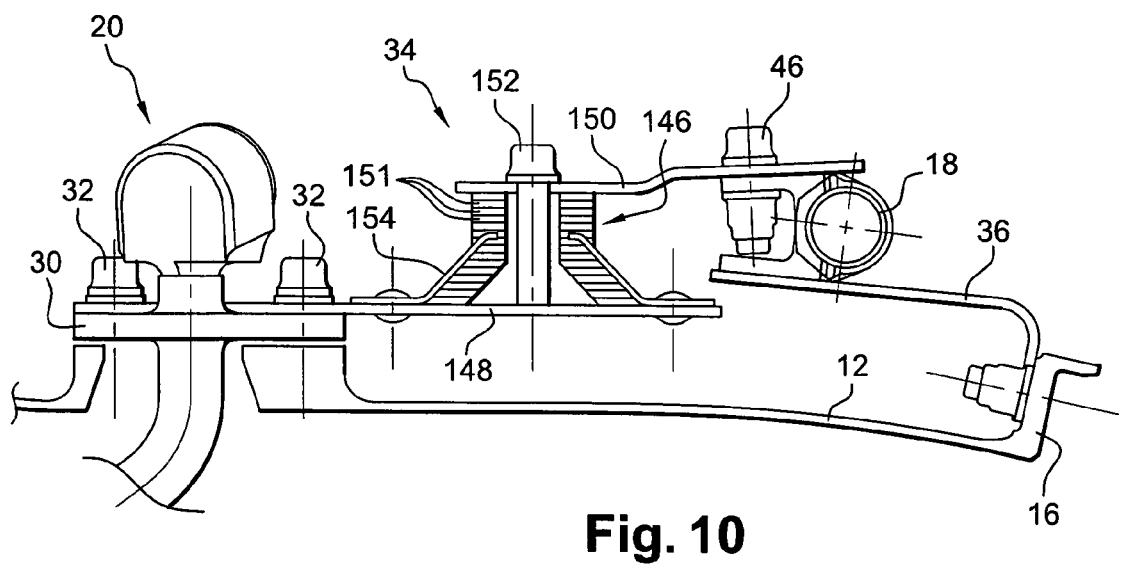

In the variant embodiment of the invention shown in FIG. 10, the support means 34 comprise a laminated abutment 146 mounted between rigid tabs 148 and 150 secured to the injector 20 and to the rail 18, respectively.

The abutment 146 which is of a known type that is commercially available comprises a stack of elastomer washers 151 secured by a central screw 152 to the outer tab 150 and by a frustoconical washer 154 to the inner tab 148.

The two abutments of FIGS. 9 and 10 provide the same advantages as the embodiments of the preceding figures.

What is claimed is:

1. A device for feeding fuel to a combustion chamber in a turbomachine, the device comprising:
    an annular fuel feed rail that extends around an outer cylindrical casing of the combustion chamber and that is connected to a fuel feed device;
    a plurality of injectors that are secured to the casing and that opens out into the combustion chamber;
    angled fuel transport ducts that connect the fuel feed rail to the injectors; and
    a rail support mechanism that connects the injectors to the fuel feed rail,
    wherein the rail support mechanism includes a connecting mechanism that is deformable in bending, twisting, and pivoting such that the rail support mechanism allows the casing to expand thermally in a radial direction relative to the annular rail and such that the rail support mechanism provides a rigid support for the annular rail,
    wherein the connecting mechanism includes at least one traction spring mounted between the rigid tabs that are in alignment with each other and that are spaced apart from each other, and
    wherein the at least one traction spring is disposed at an angle of about 20 degrees relative to an axis of the casing and slopes outwards from an upstream end of the casing to a downstream end of the casing.

2. A device according to claim 1, wherein the connecting mechanism is connected to the annular rail and to the injectors by rigid tabs extending in a common plane.

3. A device according to claim 1, wherein the connecting mechanism includes two traction springs mounted in parallel beside each other between said rigid tabs.

4. A device according to claim 1, wherein the connecting mechanism includes at least one traction spring, a first end of the at least one traction spring is mounted to a first rigid tab, a second end of the at least one traction spring is mounted to a second rigid tab, the first rigid tab is connected to the annular rail, the second rigid tab is connected to at least one of the injectors, and
    wherein a first end of the first rigid tab and a first end of the second rigid tab extend towards each other in a common plane.

5. A device according to claim 4, wherein the first rigid tab and the second rigid tab are not parallel when the at least one traction spring is bent.

* * * * *